United States Patent
DePaso (10) Patent No.: US 7,195,115 B2
(45) Date of Patent: Mar. 27, 2007

(54) MODULAR-BELT CONVEYORS WITH VARIABLE-SPEED DRIVE MOTORS

(75) Inventor: Joseph M. DePaso, Gretna, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/160,944

(22) Filed: Jul. 15, 2005

(65) Prior Publication Data

US 2007/0012547 A1   Jan. 18, 2007

(51) Int. Cl.
*B65G 23/06* (2006.01)
*B65G 23/00* (2006.01)
*B65G 43/00* (2006.01)
*B65G 47/00* (2006.01)

(52) U.S. Cl. .............. 198/834; 198/832; 198/502.4; 198/810.01

(58) Field of Classification Search ........... 198/322, 198/330, 810.01, 502.4, 834
See application file for complete search history.

(56) References Cited

U.S. PATENT DOCUMENTS

| | | | | |
|---|---|---|---|---|
| 4,349,101 | A | | 9/1982 | Eldred et al. ............ 198/851 |
| 4,765,456 | A | * | 8/1988 | Bower .................. 198/810.01 |
| 4,825,999 | A | | 5/1989 | Hammer ................... 198/834 |
| 4,993,543 | A | | 2/1991 | Lapeyre .................... 198/834 |
| 5,210,473 | A | * | 5/1993 | Backstrand ................. 318/99 |
| 5,388,685 | A | | 2/1995 | Szuba .................... 198/803.2 |
| 6,155,401 | A | * | 12/2000 | Lunardi et al. ............ 198/330 |
| 6,292,710 | B1 | * | 9/2001 | Bonnet ................... 700/230 |
| 6,351,096 | B1 | | 2/2002 | Jang ....................... 318/811 |
| 6,446,788 | B1 | * | 9/2002 | Leidy et al. ............ 198/502.4 |
| 6,488,193 | B1 | * | 12/2002 | Eckman et al. ............ 226/20 |
| 6,543,609 | B2 | * | 4/2003 | Layne et al. .............. 198/837 |
| 6,637,579 | B2 | | 10/2003 | Pietz ...................... 198/322 |
| 6,758,327 | B1 | | 7/2004 | Stebnicki et al. .......... 198/832 |
| 6,761,263 | B2 | * | 7/2004 | Becker et al. ......... 198/810.01 |
| 6,834,754 | B2 | | 12/2004 | Pietz ...................... 198/330 |
| 6,874,613 | B2 | | 4/2005 | Pietz ...................... 198/330 |
| 6,892,874 | B2 | | 5/2005 | Pietz ...................... 198/322 |
| 2005/0011734 | A1 | | 1/2005 | Suzuki et al. .............. 198/834 |
| 2005/0061608 | A1 | | 3/2005 | Pietz ...................... 198/330 |
| 2005/0061609 | A1 | | 3/2005 | Pietz ...................... 198/330 |

FOREIGN PATENT DOCUMENTS

GB   2243430 A   10/1991

* cited by examiner

*Primary Examiner*—Gene O. Crawford
*Assistant Examiner*—Ramya G. Prakasam
(74) *Attorney, Agent, or Firm*—James T. Cronvich (57) ABSTRACT

A conveyor system in which a modular belt or chain is driven by a drive element rotated at a predetermined variable angular speed to compensate for speed fluctuations due to chordal action. A speed signal generator generates a speed signal generally inverse to the uncompensated linear speed of a belt driven by drive elements rotated at a constant angular speed. The speed signal generator detects an encoded pattern rotating in known relationship to the drive element. The encoded pattern represents a predetermined speed profile that is used to compensate for belt speed fluctuations or to provide custom belt speed performance.

25 Claims, 5 Drawing Sheets

8 tooth sprocket

FIG. 1A 24 tooth sprocket

MODULAR-BELT CONVEYORS WITH VARIABLE-SPEED DRIVE MOTORS

BACKGROUND

The invention relates generally to power-driven conveyors and methods for driving such conveyors. More particularly, the invention relates to belt or chain conveyors positively engaged by drive elements rotated by variable-speed drive motors.

Figure 1A:
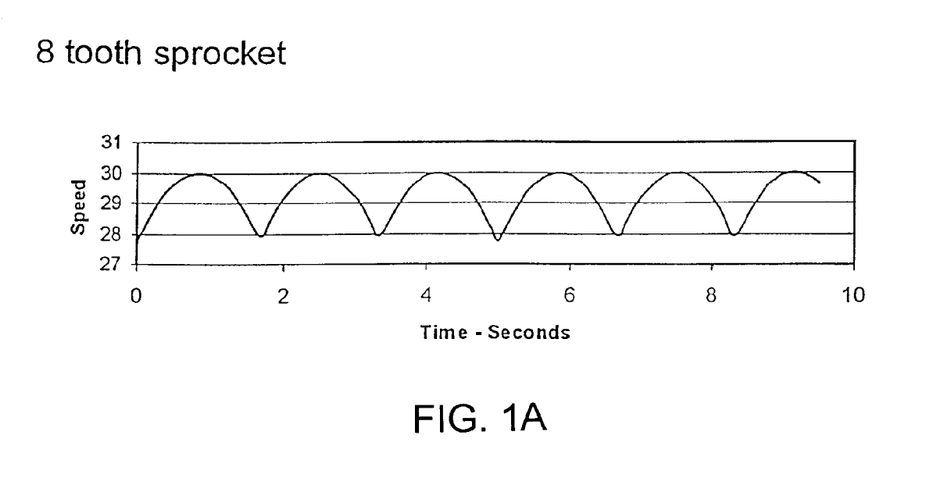
FIGS. 1A and 1B are time plots of the linear speed of a link chain or modular conveyor belt driven by 8- and 24-tooth drive sprockets rotated at a constant angular speed.
Figure 1B:
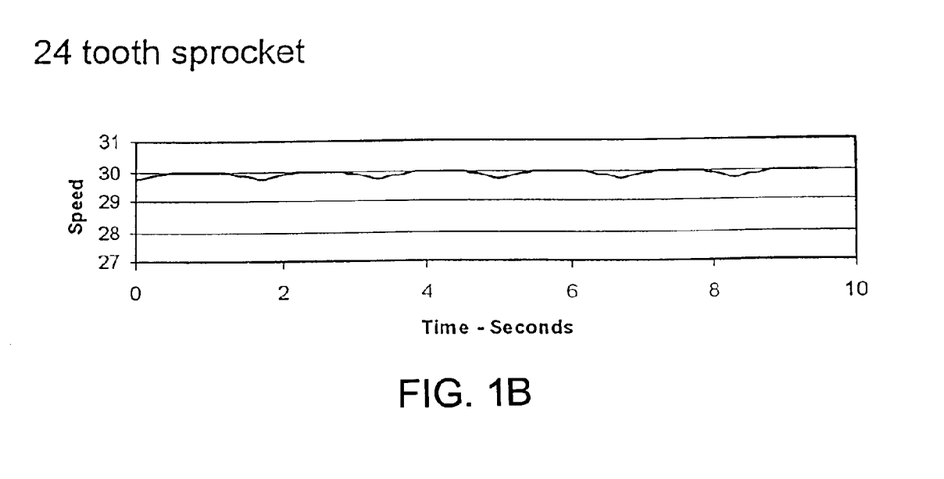

Modular plastic conveyor belts and chains are constructed of rows of belt modules or chain links connected together by hinge pins at hinge joints into endless loops. Such a belt or chain is trained about rotatable drive and idler wheels, such as sprockets or drums. The drive wheels are rotated by motors. Control surfaces, such as teeth, on the periphery of the drive and idler wheels positively engage corresponding surfaces on the belts or chains. Because the hingedly joined chain links or belt rows are rigid, a chain or belt forms a polygon about the drive wheel. Thus, the radius of the belt or chain varies periodically around the drive wheel. As the motor rotates the drive wheel at a constant angular speed, the varying radius causes the linear speed of the belt or chain to fluctuate and the belt rows or chain links to rise and fall with respect to their line of engagement with the drive wheel. This "chordal action," or "polygon effect," causes a periodic vibrating motion and linear belt or chain speed variation, which can jostle conveyed articles in a product conveyor, annoy passengers on a moving walkway, or even induce resonance and high amplitude oscillations. The effect can be decreased by increasing the number of contact surfaces around the circumference of the drive wheel. FIGS. 1A and 1B show the linear speed of a belt or chain for 8- and 24-tooth sprockets driven at a constant angular speed. But, even with the smaller belt speed variation with 24-tooth sprockets, the effect may still be intolerable in certain applications. And the increased radius of a 24-tooth sprocket may not be acceptable in space-limited applications.

One approach that is used to decrease the vibration due to chordal action is to position guides at the entry of the belt to the sprocket to confine the range of the rise and fall of the belt. But impacts and rubbing between belt and guides can damage both. Another approach to reducing the chordal action is described in U.S. Pat. No. 6,892,874 to Pietz. The patent describes a device for reducing the polygon effect in a pedestrian conveyor. The device includes a reversing wheel, a gear acting on the reversing wheel, a power supply unit, and a variable-speed electric motor coupled to the gear and the power supply unit. The drive also includes a function generator, a controlling apparatus coupled to the function generator, and at least one position sensor for detecting a phase position of the reversing wheel. The sensor or sensors send the phase position to the controlling apparatus, which transmits a synchronized set speed value to the power supply unit based on the phase position. In this closed-loop control device, it is important for the controlling apparatus to maintain synchronism between the position sensor signal and the set speed signal. Furthermore, the device does not address the problem of resonance caused by the periodic speed variations.

Thus, there is a need for a belt conveyor in which the belt advances linearly at a constant speed, even with small-diameter drive wheels.

SUMMARY

This need and other needs are satisfied by a belt conveyor embodying features of the invention and comprising a conveyor belt constructed of a series of rows of belt links hingedly connected together into an endless loop that is drivingly engaged by a drive wheel mounted on a drive shaft. A motor is coupled to the drive shaft to rotate the drive shaft and the drive wheel. A motor drive connected to the motor controls the speed of the motor. A speed signal generator operatively coupled to the drive shaft generates a speed signal inversely related to the magnitude of the speed variation of the conveyor belt when the drive wheel is driven at a constant angular speed. The speed signal generator sends the speed signal to the motor drive to adjust the speed of the motor to compensate for chordal action.

According to another aspect of the invention, a belt conveyor comprises a conveyor belt constructed of a series of rows of belt links hingedly connected together into an endless loop and a rotatable drive element having N drive surfaces spaced circumferentially around the periphery of the rotatable drive element to consecutively engage each successive row of the conveyor belt in driving contact. A motor coupled to the drive element rotates the drive element to advance the conveyor belt. A motor drive is connected to the motor to control the speed of the motor. A speed signal generator operatively coupled to the rotatable drive element generates a speed signal that varies between a maximum value and a minimum value for each rotation of the drive element through an angle of 360°/N. The speed signal generator sends the speed signal to the motor drive to adjust the speed of the motor.

According to yet another aspect of the invention, a belt conveyor comprising a conveyor belt constructed of a series of rows of belt links hingedly connected together into an endless loop is engaged by a rotatable drive element. The rotatable drive element has drive surfaces spaced circumferentially around its periphery to consecutively engage each successive row of the conveyor belt in driving contact. A motor coupled to the drive element rotates the drive element to advance the conveyor belt. A motor drive connected to the motor controls the speed of the motor. A speed signal generator operatively coupled to the rotatable drive element generates a speed signal from a predetermined speed profile function F(θ), where θ is the angular position of the rotatable drive element. The speed signal generator sends the speed signal to the motor drive to adjust the speed of the motor.

In still another aspect of the invention, a belt conveyor comprises a conveyor belt constructed of a series of rows of belt links hingedly connected together into an endless loop drivingly engaged by a drive element mounted on a drive shaft. A motor coupled to the drive shaft rotates the drive shaft and the drive element. A motor drive is connected to the motor to control the speed of the motor. A rotary element operatively coupled to the drive shaft to rotate as the drive element rotates includes a predetermined detectable pattern that varies regularly with the rotation of the rotary element. A detector sensitive to the rotary element for detecting the pattern as the rotary element rotates generates a speed signal corresponding to pattern. The detector sends the speed signal to the motor drive to adjust the speed of the motor.

Another aspect of the invention provides a speed control for a belt conveyor that includes a conveyor belt constructed of a series of rows of belt links hingedly connected together into an endless loop engaged by a rotatable drive element driven by a motor. The speed control comprises a motor drive connected to the motor to control the speed of the motor and a speed signal generator operatively coupled to the drive element to generate a speed signal inversely related to the magnitude of the speed variation of the conveyor belt when the drive element is driven at a constant angular speed. The speed signal generator sends the speed signal to the motor drive to adjust the speed of the motor.

Yet another aspect of the invention provides a method for controlling the speed of a conveyor having a modular belt driven by a rotatable element rotated by a drive motor controlled by a motor drive. The method comprises: determining an open-loop speed profile of the modular belt as a function of the angular position of the rotatable element as the rotatable element is rotated at a constant angular speed; developing an inverse speed profile as a function of the angular position of the rotatable element inversely related to the variation in the open-loop speed profile; detecting the inverse speed profile as the modular conveyor belt is driven to generate a signal representative of the inverse speed profile; and sending the signal to the motor drive to adjust the speed of the motor.

BRIEF DESCRIPTION OF THE DRAWINGS

Other features and aspects of the invention, as well as its advantages, are better understood by reference to the following description, appended claims, and accompanying drawings, in which:

DETAILED DESCRIPTION

Figure 2:
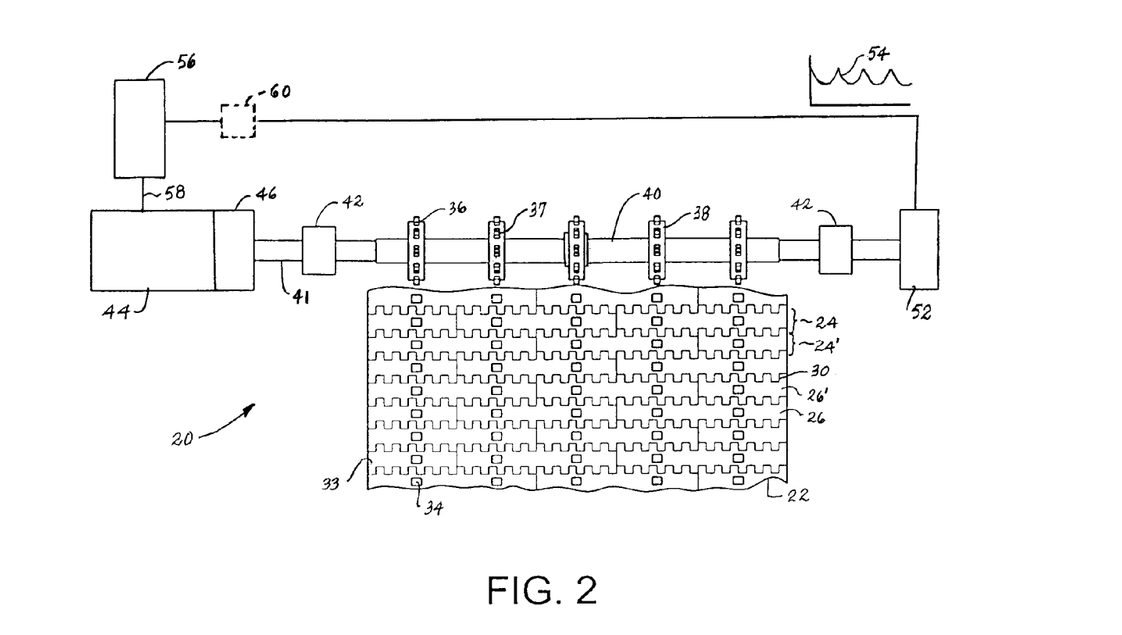
FIG. 2 is a top plan pictorial depiction of a portion of a speed-controlled, modular-belt conveyor system embodying features of the invention.
Figure 3:
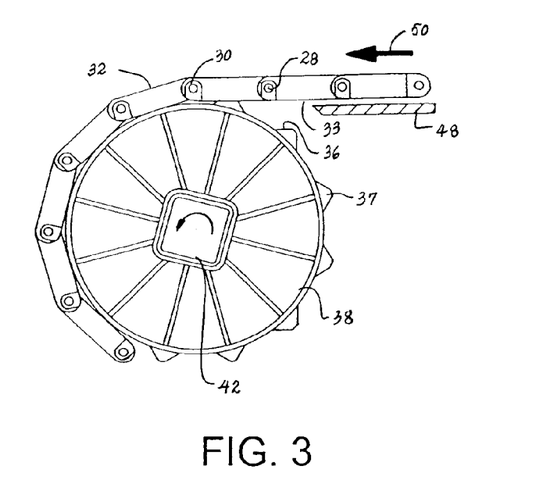
FIG. 3 is a side elevation view of belt-sprocket engagement in a conveyor system as in FIG. 2.

One version of a modular-belt conveyor system embodying features of the invention is shown in FIGS. 2 and 3. The conveyor system 20 includes a modular conveyor belt 22 constructed of a series of rows 24, 24' of belt modules 26, 26' connected end to end by hinge rods 28 at hinge joints 30 between consecutive rows. (The distance between consecutive hinge joints defines the pitch of the belt.) Although each row of the belt could contain only a single module, or link, as in a chain, the belt preferably includes a number of side-by-side links in each row arranged in a bricklay pattern with the links of other rows to form an endless conveyor belt. Modular plastic belts such as these are manufactured and sold, for example, by Intralox, L.L.C., of Harahan, La., U.S.A., and are used in many conveying applications, including goods conveyors and pedestrian walkways.

The conveyor belt extends in thickness from an inner surface 33 to an outer conveying surface 32 atop which articles or persons are conveyed. Drive-receiving surfaces 34 on the inner belt surface receive a driving force from drive surfaces 36, such as the faces of teeth 37 on the peripheries of drive elements, for example, drive wheels comprising drums or drive sprockets 38. Consecutive teeth are positioned on regular spacings related to the belt's pitch. The belt is trained between drive sprockets 38 at one end of the conveyor and idler sprockets (not shown) at the other end. The drive wheels are spaced apart axially along a drive shaft 40 received in a central bore 42 of each wheel. The bore and the shaft may be square as shown, but could be some other shape, such as circular with a key. Rounded ends 41 of the drive shaft are supported in bearing blocks 42. The drive wheels on the drive shaft are rotated by an electric motor 44, typically coupled to the shaft through a gearbox 46. As the drive wheels rotate, they advance the belt linearly along a carryway 48 in a direction of belt travel 50.

A speed signal generator 52 is operatively coupled to the drive shaft. The speed signal generator generates a speed signal 54 that is inversely related to the magnitude of the linear speed variation of the conveyor belt along the carryway in the direction of belt travel when the drive wheels are rotated at a constant angular velocity. This uncompensated linear speed is represented by the waveforms in FIGS. 1A and 1B for 8- and 24-tooth sprockets. The speed characteristics repeat regularly with the pitch of the belt. The speed signal generator is encoded with a pattern that produces an inverse relationship to the uncompensated belt speed as indicated in the speed signal waveform 54. The speed signal is applied to a motor drive 56, such as a variable-frequency drive, to adjust the speed of the motor according to the speed signal over control lines 58. In this way, the linear belt speed variations due to chordal action can be compensated for by varying the speed of the drive motor and, consequently, the rotational speed of the drive wheels. The speed signal may optionally be advanced or retarded in a filter element 60, which may be realized in an analog or a digital filter with adjustable or fixed phase adjustment. This phase adjustment allows the rotational speed to be tuned to optimize the linear speed of the belt by compensating for various system time constants.

Figure 4:
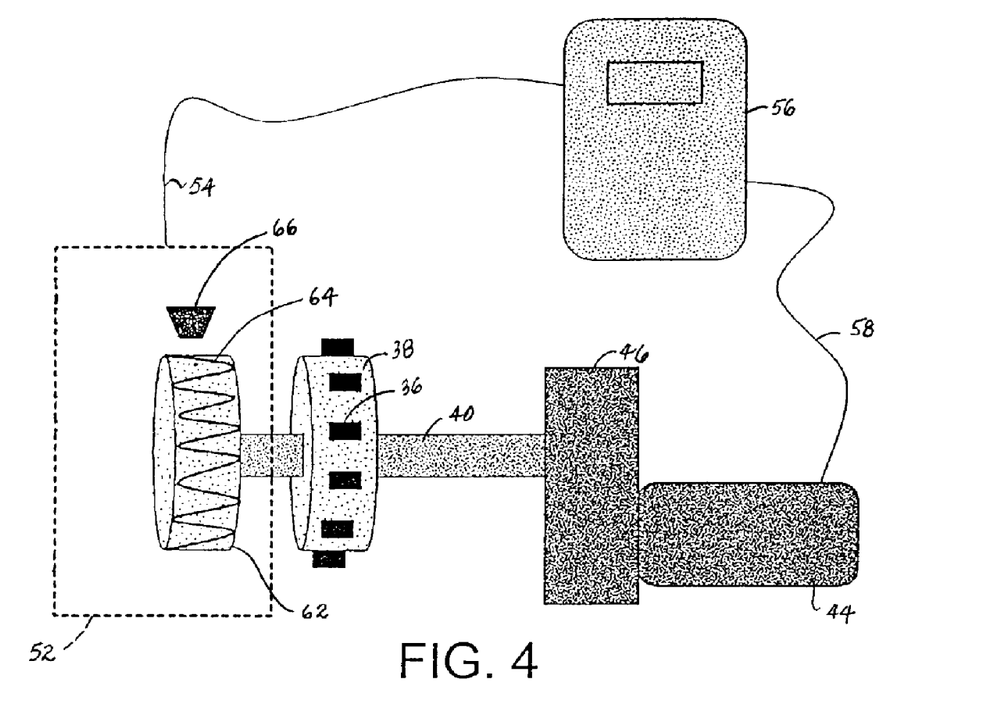
FIG. 4 is a pictorial diagram of one version of a conveyor system as in FIG. 2 featuring a shaft encoder.
Figure 5:
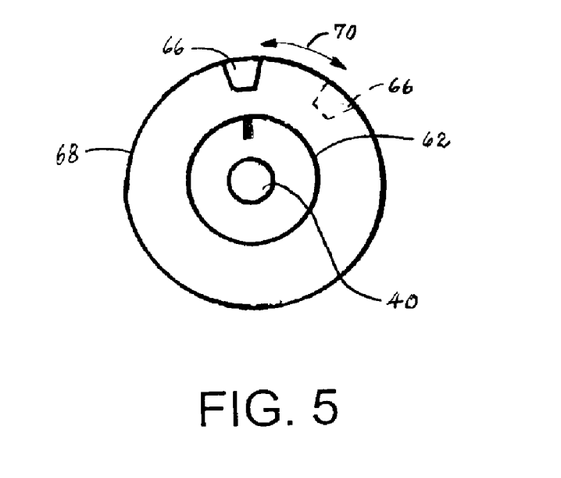
FIG. 5 is an end-on view of a phase-adjustable shaft encoder as in FIG. 4.

One version of a speed signal generator is shown in FIGS. 4 and 5. In this version, the speed signal generator 52 is realized as an optical shaft encoder having a rotor 62 mounted on the drive shaft 40 for rotation with the drive wheels 38. Encoded on the rotor is a pattern 64 that repeats with each consecutive drive surface 36 of the drive wheel. The pattern is related to the uncompensated linear belt speed as the shaft is rotated at a constant angular speed. A reader or detector, in the form of an optical sensor 66, detects the pattern and sends a speed signal 54 that varies inversely with the uncompensated linear belt speed to the drive motor 56. The drive adds this speed signal to the constant speed signal to produce a variable-frequency signal over the control lines 58 to the motor 44 coupled to the shaft via the gearbox 46. The phase of the speed signal relative to the rotational position of the shaft can be adjusted by a filter element as in FIG. 2 or by rotating the detector 66 relative to the rotor 62. The detector is attached to the housing 68 surrounding the rotor. The housing may be rotated in either direction as shown by double-headed arrow 70 in FIG. 5 to advance or retard the phase of the speed signal relative to the angular position of the drive shaft and constitutes an alternative phasing means for fine-tuning speed control of the belt.

Figure 6:
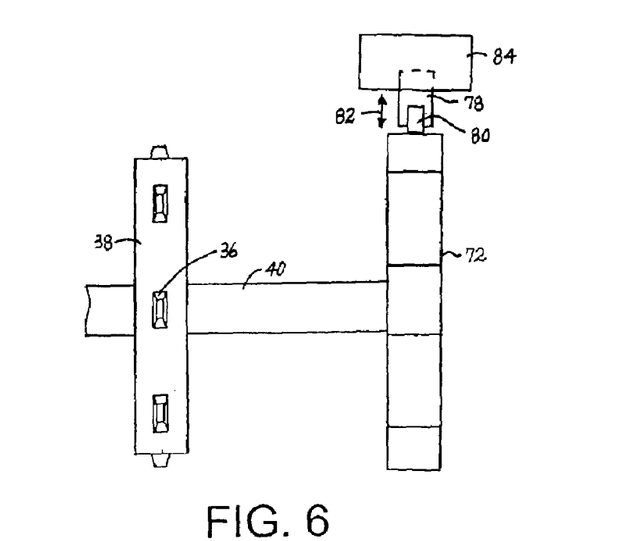
FIG. 6 is an end elevation pictorial of a portion of the drive shaft of another version of speed control for a modular belt as in FIG. 2 including a multi-lobed inverse sprocket.
Figure 7:
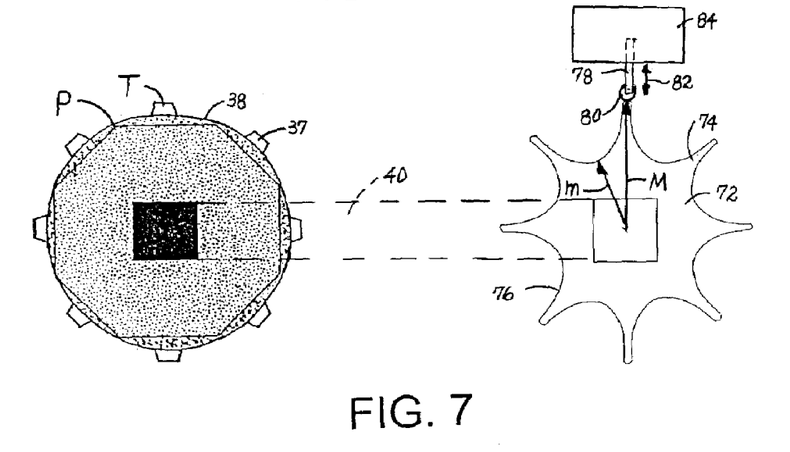
FIG. 7 is a side-view pictorial representation of the drive sprocket and the inverse sprocket of FIG. 6.

Another realization of a speed signal generator is shown in FIGS. 6 and 7. In this version, an inverse sprocket 72 is mounted for rotation on the drive shaft 40 along with the drive wheel 38. Each tooth on the periphery of the drive wheel 37 is associated with a lobe 74 forming a portion of the periphery of the inverse sprocket. The sprocket is called an inverse sprocket because the multi-lobe pattern is inversely related to the uncompensated linear belt speed for a drive shaft rotated at a constant angular speed. In this example, the radial distance from the center of rotation to the periphery of the inverse sprocket is generally proportional to the desired speed signal's amplitude. Thus, the speed signal's amplitude is a maximum M when the drive wheel's tooth is at the top position T and a minimum m when the midpoint P between consecutive teeth is at the top position T. The periphery of the rotating sprocket forms a cam 76 whose distance varies between M and m with the angular position of the shaft. The angular position of the cam sprocket is detected by a cam follower 78 with a roller 80 that rides along the cam surface. As the cam rotates, the follower translates according to arrow 82 into a detector 84, which converts the amplitude of the translations into the proportional speed signal. For the 8-tooth drive wheel in FIG. 7, the associated lobed cam surface varies regularly between the maximum M and the minimum m every 360°/8, or 45°. In general, for a drive element with N equi-spaced drive surfaces, the speed signal derived from a speed signal generator, whether a mechanical cam or an electronic encoder, varies from a maximum to a minimum for each rotation of the drive element through 360°/N.

The periphery of the cam sprocket or the pattern on the optical encoder can also be represented as a mathematical function $F(\theta)$ defining a speed profile as a function of the angular position $\theta$ of the rotating drive wheel. In the case of the lobed cam, $F(\theta)$ is just the radial distance of the cam surface from its center of rotation at any angular position $\theta$. Although $F(\theta)$ represents a speed profile to compensate for speed fluctuations due to chordal action in the examples presented, it could also represent other speed profiles designed for other desired performance objectives. The speed profile $F(\theta)$ may be determined experimentally or analytically for each drive wheel pitch, number of teeth, method of engagement, or any other pertinent physical factor.

Figure 8:
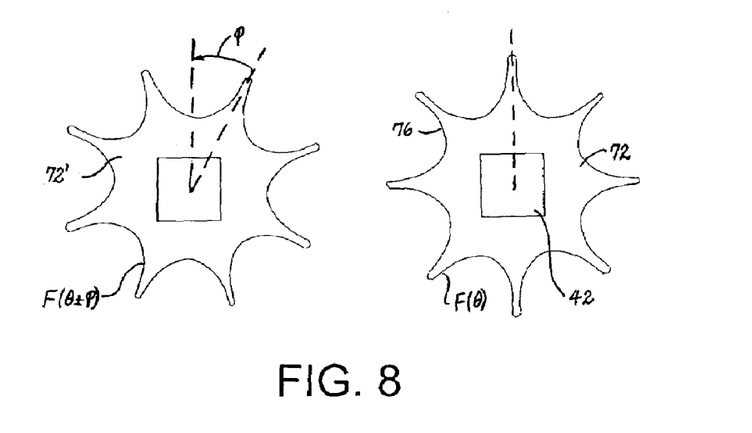
FIG. 8 shows two inverse sprockets out of phase with each other.

Like the phase of the speed signal relative to the rotational position of the drive wheel in the optically encoded speed control, the phase of the cam sprocket can also be adjusted. As one example, the phase of the clockwise-rotating sprocket on the left 72' in FIG. 8 lags the sprocket on the right 72 by an angle $\Phi$ of 22.50° (1/16 of a rotation, or 180° in the speed signal). The phase shift $\Phi$ is due to the orientation of the square bore 42 relative to the peripheral pattern forming the cam surface 76. Thus, the profile of the periphery, which can be advanced or retarded, is given by $F(\theta\pm\Phi)$. The example shows a gross adjustment. Much smaller phase shifts, such as to align lobe maxima with the driving faces rather than the centers of the teeth or to compensate for inherent delays in mechanical response times in the drive train or in the speed detectors, are more likely. Some examples of mechanical ways to adjust the phase of one cam sprocket are: using a round bore with key structure circumferentially spaced around the bore wall; using a polygonal bore that can receive a square shaft in a number of relative orientations; and adjusting the position of the cam follower relative to the cam.

Figure 9:
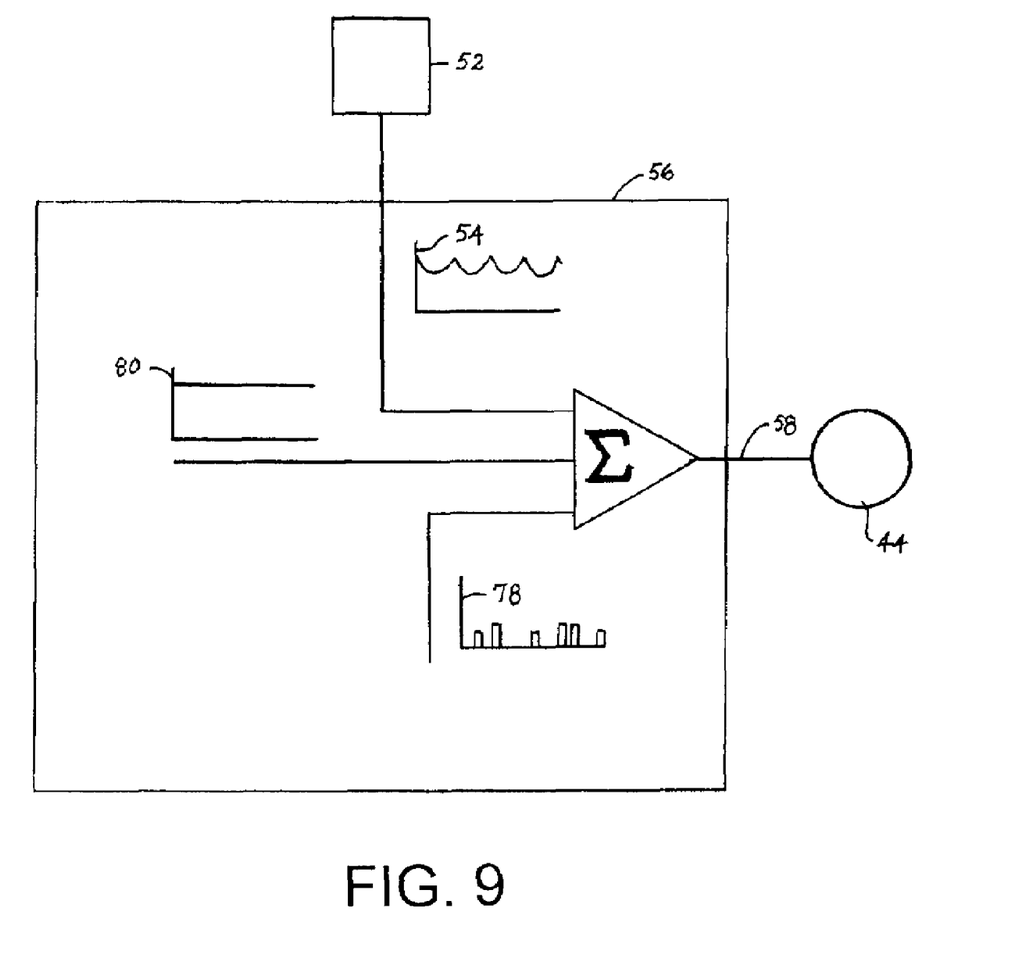
FIG. 9 is a block diagram of an anti-resonance feature usable in a conveyor system as in FIG. 2.

The periodic variation in speed due to chordal action or the periodic speed compensation signal provided to the drive may serve as a forcing function to induce resonance in a belt system. One way to squelch any tendency of the system to resonate is to aperiodically send speed impulse signals to the motor. The block diagram of FIG. 9 shows an anti-resonance impulse signal 78 added to a steady-state drive signal 80 and the compensation speed signal 54 to produce a composite drive control signal on the control line 58 that breaks or prevents resonances from even building. The anti-resonance signal may be generated internally in the motor drive or externally from a separate device. Its amplitude may be constant or vary from pulse to pulse or within each pulse.

Thus, the invention provides a variable-speed device that compensates for belt linear speed fluctuations due to the chordal effect of a rigid modular belt engaging a rotating drive element. This allows small-diameter sprockets with few teeth to be used in space-limited conveyor installations.

Although the invention has been described in detail with respect to a few preferred versions, other versions are possible. For example, the speed signal generators were all shown with rotors mounted directly on the drive shaft for rotation with the drive wheels, but an intervening drive train or gearbox or a separate idle shaft with an idle wheel engaging the belt could operatively couple the speed signal generator to the drive shaft with any gear ratio accounted for. As another example, the versions described were shown in an open-loop control without feedback from sensors, such as speed monitors or sprocket or belt position sensors for synchronizing a speed compensation signal to sprocket position. But it would be possible to add feedback for tighter supervision and control. As yet another example, the encoder could use any appropriate technology in addition to optoelectronics or a mechanical cam. It could be encoded on a magnetic medium, and the detector could be any device suitable for reading the encoded medium. As still another example, the motor could be voltage- rather than frequency-controlled with the drive outputting a control signal whose amplitude corresponds to the desired speed. Moreover, the signals could be transmitted ohmically, optically, or wirelessly between devices. So, as these few examples suggest, the scope of the claims is not meant to be limited to the preferred versions described in detail.

The invention claimed is:

1. A belt conveyor comprising:
    a conveyor belt constructed of a series of rows of belt links hingedly connected together into an endless loop;
    a drive shaft;
    a drive wheel mounted on the drive shaft and drivingly engaging the conveyor belt;
    a motor coupled to the drive shaft to rotate the drive shaft and the drive wheel;
    a motor drive connected to the motor to control the speed of the motor;
    a speed signal generator having a rotary element operatively coupled to the drive shaft and encoded with a detectable speed-profile pattern representing an inverse relationship with the magnitude of the speed variation of the conveyor belt when the drive wheel is driven at a constant angular speed, and having a detector for detecting the variation of the pattern with the rotation of the drive wheel;
    wherein the speed signal generator sends a speed signal corresponding to the varying pattern to the motor drive to adjust the speed of the motor to compensate for chordal action.

2. A belt conveyor as in claim 1 wherein the speed signal generator includes an optical shaft encoder including the rotary element.

3. A belt conveyor as in claim 1 wherein:
the rotary element includes a cam sprocket mounted on the drive shaft for rotation with the drive wheel on the drive shaft's axis, wherein the cam sprocket includes a peripheral surface forming a cam encoded with a multi-lobed profile representing the speed variation of the conveyor belt when the drive wheel is driven at a constant angular speed; and
the detector includes a cam follower contacting the cam and moving proportional to the radial distance from the axis of the drive shaft to the point of contact of the cam follower with the cam, the detector generating the speed signal corresponding to the motion of the cam follower.

4. A belt conveyor as in claim 1 further comprising phasing means coupled to the speed signal generator for advancing or retarding the speed signal relative to the rotation of the drive shaft.

5. A belt conveyor as in claim 1 further comprising means for providing aperiodic speed impulse signals to the motor drive to deter resonance in the belt.

6. A belt conveyor as in claim 1 wherein the motor drive is a variable-frequency drive.

7. A belt conveyor comprising:
a conveyor belt constructed of a series of rows of belt links hingedly connected together into an endless loop;
a rotatable drive element having N drive surfaces spaced circumferentially around the periphery of the rotatable drive element to consecutively engage each successive row of the conveyor belt in driving contact;
a motor coupled to the drive element to rotate the drive element to advance the conveyor belt;
a motor drive connected to the motor to control the speed of the motor;
a speed signal generator having a rotary element operatively coupled to the rotatable drive element for rotation therewith and encoded with a speed-profile pattern that varies between a maximum value and a minimum value for each rotation of the drive element through an angle of 360°/N, and a detector for detecting the pattern as the rotary element rotates;
wherein the speed signal generator sends a speed signal representing the detected pattern to the motor drive to adjust the speed of the motor.

8. A belt conveyor as in claim 7 wherein the speed signal generator includes an optical encoder including the rotary element.

9. A belt conveyor as in claim 7 wherein:
the rotary element includes a cam operatively coupled to the rotatable drive element to rotate on an axis as the rotatable element rotates, wherein the cam includes a peripheral surface defining a multi-lobed profile representing the speed variation of the conveyor belt when the rotatable drive element is driven at a constant angular speed; and
the detector includes a cam follower contacting the cam and moving proportional to the radial distance from the axis of cam to the point of contact of the cam follower with the cam, the detector generating the speed signal corresponding to the motion of the cam follower.

10. A belt conveyor as in claim 7 further comprising phasing means coupled to the speed signal generator for advancing or retarding the maximum and minimum values of the speed signal relative to the rotation of the rotatable drive element.

11. A belt conveyor as in claim 7 further comprising means for providing aperiodic speed impulse signals to the motor drive to deter resonance in the belt.

12. A belt conveyor comprising:
a conveyor belt constructed of a series of rows of belt links hingedly connected together into an endless loop;
a rotatable drive element having a plurality of drive surfaces spaced circumferentially around the periphery of the rotatable drive element to consecutively engage each successive row of the conveyor belt in driving contact;
a motor coupled to the drive element to rotate the drive element to advance the conveyor belt;
a motor drive connected to the motor to control the speed of the motor;
a speed signal generator having a rotary element rotating with the rotatable drive element and encoded with a detectable pattern defined by a predetermined speed profile function $F(\theta)$, where $\theta$ is the angular position of the rotatable drive element, and a detector sensitive to the pattern;
wherein the speed signal generator generates a speed signal corresponding to the detected pattern and sends the speed signal to the motor drive to adjust the speed of the motor.

13. A belt conveyor as in claim 12 wherein the predetermined speed profile function $F(\theta)$ repeats with the spacing of the drive surfaces on the periphery of the rotatable drive element.

14. A belt conveyor as in claim 12 wherein the predetermined speed profile function $F(\theta)$ is inversely related to the magnitude of the speed variation of the conveyor belt when the rotatable drive element is driven at a constant angular speed.

15. A belt conveyor comprising:
a conveyor belt constructed of a series of rows of belt links hingedly connected together into an endless loop;
a rotatable drive element having a plurality of drive surfaces spaced circumferentially around the periphery of the rotatable drive element to consecutively engage each successive row of the conveyor belt in driving contact;
a motor coupled to the drive element to rotate the drive element to advance the conveyor belt;
a motor drive connected to the motor to control the speed of the motor;
a speed signal generator operatively coupled to the rotatable drive element to generate a speed signal from a predetermined speed profile function $F(\theta)$ where $\theta$ is the angular position of the rotatable drive element;
wherein the speed signal generator sends the speed signal to the motor drive to adjust the speed of the motor;
wherein the speed signal generator includes an optical encoder rotating with the drive element and encoded with a pattern representing $F(\theta)$.

16. A belt conveyor comprising:
a conveyor belt constructed of a series of rows of belt links hingedly connected together into an endless loop;
a rotatable drive element having a plurality of drive surfaces spaced circumferentially around the periphery of the rotatable drive element to consecutively engage each successive row of the conveyor belt in driving contact;
a motor coupled to the drive element to rotate the drive element to advance the conveyor belt;
a motor drive connected to the motor to control the speed of the motor;

a speed signal generator operatively coupled to the rotatable drive element to generate a speed signal from a predetermined speed profile function $F(\theta)$ where $\theta$ is the angular position of the rotatable drive element;

wherein the speed signal generator sends the speed signal to the motor drive to adjust the speed of the motor;

wherein the speed signal generator includes:

a cam operatively coupled to the rotatable drive element to rotate on an axis as the rotatable element rotates, wherein the cam includes a peripheral surface defining a multi-lobed profile representing $F(\theta)$; and a detector including a cam follower contacting the cam and moving proportional to the radial distance from the axis of cam to the point of contact of the cam follower with the cam, the detector generating the speed signal corresponding to the motion of the cam follower.

17. A belt conveyor as in claim 12 further comprising phasing means coupled to the speed signal generator for advancing or retarding the speed profile function by a phase angle $\phi$ to produce a phase-adjusted speed profile function $F(\theta \pm \phi)$.

18. A belt conveyor as in claim 12 further comprising means for providing aperiodic speed impulse signals to the motor drive to deter resonance in the belt.

19. A belt conveyor as in claim 12 wherein the motor drive is a variable-frequency drive.

20. A belt conveyor comprising:
a conveyor belt constructed of a series of rows of belt links hingedly connected together into an endless loop;
a drive shaft;
a drive element mounted on the drive shaft and drivingly engaging the conveyor belt;
a motor coupled to the drive shaft to rotate the drive shaft and the drive element;
a motor drive connected to the motor to control the speed of the motor;
a rotary element coupled to the drive shaft for rotation as the drive element rotates;
wherein the rotary element includes a predetermined detectable pattern defining a speed profile that varies regularly with the rotation of the rotary element;
a detector sensitive to the rotary element for detecting the pattern as the rotary element rotates and generating a speed signal corresponding to the pattern;
wherein the detector sends the speed signal to the motor drive to adjust the speed of the motor.

21. A belt conveyor as in claim 20 wherein the rotary element is mounted directly on the drive shaft.

22. A belt conveyor as in claim 20 wherein the rotary element includes an encoded rotor of an optical shaft encoder and the detector includes an optical reader of the shaft encoder.

23. A belt conveyor as in claim 20 wherein the rotary element includes a multi-lobed cam and the detector includes a cam follower riding on the cam.

24. A belt conveyor as in claim 20 wherein the rotary element includes phasing means for advancing or retarding the predetermined detectable pattern relative to the rotation of the drive shaft.

25. A belt conveyor as in claim 20 further comprising phasing means for delaying the speed signal to the motor drive.

* * * * *